US012603225B2

(12) United States Patent
Byun et al.

(10) Patent No.: US 12,603,225 B2
(45) Date of Patent: Apr. 14, 2026

(54) MULTILAYER CAPACITOR INCLUDING NOISE REDUCTION INSULATING LAYER COVERING ONE SURFACE OF BODY AND EXTERNAL ELECTRODES

(71) Applicant: SAMSUNG ELECTRO-MECHANICS CO., LTD., Suwon-si (KR)

(72) Inventors: Man Su Byun, Suwon-si (KR); Dae Heon Jeong, Suwon-si (KR); Soo Hwan Son, Suwon-si (KR); Won Chul Sim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 329 days.

(21) Appl. No.: 17/715,267

(22) Filed: Apr. 7, 2022

(65) Prior Publication Data

US 2023/0187139 A1 Jun. 15, 2023

(30) Foreign Application Priority Data

Dec. 13, 2021 (KR) ........................ 10-2021-0177453

(51) Int. Cl.
*H01G 4/30* (2006.01)
*H01G 4/005* (2006.01)
(Continued)

(52) U.S. Cl.
CPC .............. *H01G 4/30* (2013.01); *H01G 4/005* (2013.01); *H01G 4/12* (2013.01); *H01G 4/224* (2013.01)

(58) Field of Classification Search
CPC ............ H01G 4/30; H01G 4/005; H01G 4/12; H01G 2/065; H01G 4/1227; H01G 4/012; H01G 4/35; H01G 4/1209; Y02E 60/13
See application file for complete search history.

(56) References Cited

U.S. PATENT DOCUMENTS 10,446,323 B1 * 10/2019 Son ......................... H01G 4/30
11,610,737 B2 3/2023 Chikuma et al.
(Continued)

FOREIGN PATENT DOCUMENTS

JP 2008-112759 A 5/2008
JP 2012-119616 A 6/2012
(Continued)

OTHER PUBLICATIONS

Office Action issued in corresponding Korean Application No. 10-2021-0177453 dated Jul. 2, 2025, with English translation.
(Continued)

*Primary Examiner* — Timothy J. Dole
*Assistant Examiner* — Daniel M Dubuisson
(74) *Attorney, Agent, or Firm* — Morgan Lewis & Bockius LLP

(57) ABSTRACT

A multilayer capacitor includes a body including a laminate structure in which at least one first internal electrode and at least one second internal electrode are alternately laminated in a first direction with at least one dielectric layer interposed therebetween; first and second external electrodes spaced apart from each other and disposed on the body to be connected to the at least one first internal electrode and the at least one second internal electrode, respectively; and a noise reduction insulating layer covering one surface of the body and one surfaces of the first and second external electrodes together.

20 Claims, 11 Drawing Sheets

(51) Int. Cl.
   *H01G 4/12* (2006.01)
   *H01G 4/224* (2006.01)

(56) References Cited

U.S. PATENT DOCUMENTS

| | | | |
|---|---|---|---|
| 2013/0037911 A1 | 2/2013 | Hattori et al. | |
| 2013/0242457 A1* | 9/2013 | Lee | H01G 4/2325 |
| | | | 361/301.4 |
| 2013/0319741 A1 | 12/2013 | Ahn et al. | |
| 2015/0124370 A1 | 5/2015 | Ahn et al. | |
| 2015/0187487 A1 | 7/2015 | Park et al. | |
| 2018/0137979 A1* | 5/2018 | Kim | H01G 4/002 |
| 2018/0144864 A1* | 5/2018 | Park | H01G 4/224 |
| 2018/0218839 A1* | 8/2018 | Watabe | H01G 4/30 |
| 2019/0019624 A1* | 1/2019 | Oh | H01G 13/006 |
| 2019/0180945 A1* | 6/2019 | Kim | H01G 4/30 |
| 2020/0126720 A1* | 4/2020 | Son | H01G 4/224 |
| 2020/0161051 A1* | 5/2020 | Tanaka | H01G 4/232 |
| 2021/0065985 A1* | 3/2021 | Kim | H01G 2/02 |
| 2021/0098193 A1* | 4/2021 | Mishima | H01G 2/065 |
| 2021/0272753 A1* | 9/2021 | Chikuma | H01G 4/224 |
| 2021/0272756 A1* | 9/2021 | Chikuma | H01G 4/248 |

FOREIGN PATENT DOCUMENTS

| | | | | |
|---|---|---|---|---|
| JP | 5472230 | B2 | 2/2014 | |
| JP | 2014027085 | A * | 2/2014 | H01G 4/232 |
| JP | 2015-90977 | A | 5/2015 | |
| JP | 6044153 | B2 | 12/2016 | |
| JP | 2020150070 | A * | 9/2020 | |
| JP | 2021-136322 | A | 9/2021 | |
| KR | 10-1309479 | B1 | 9/2013 | |
| KR | 10-2015-0080797 | A | 7/2015 | |
| KR | 10-2016501 | B1 | 9/2019 | |
| KR | 20190116162 | A * | 10/2019 | |

OTHER PUBLICATIONS

Japanese Office Action dated Dec. 16, 2025 issued in Japanese Patent Application No. 2022-065392 (with English translation).

* cited by examiner

A—A'

1

MULTILAYER CAPACITOR INCLUDING NOISE REDUCTION INSULATING LAYER COVERING ONE SURFACE OF BODY AND EXTERNAL ELECTRODES

CROSS-REFERENCE TO RELATED APPLICATIONS

This application claims benefit of priority to Korean Patent Application No. 10-2021-0177453 filed on Dec. 13, 2021 in the Korean Intellectual Property Office, the disclosures of which are incorporated herein by references in its entirety.

TECHNICAL FIELD

The present disclosure relates to a multilayer capacitor.

BACKGROUND

A multilayer capacitor has been widely used as a component of electronic devices such as computers, PDAS, mobile phones, and the like, as a multilayer capacitor may have a small size and high capacitance, and may be easily mounted, and a multilayer capacitor has also been used as a component of electrical devices (including vehicles) as a multilayer capacitor may have high reliability and high strength.

A dielectric material having a high dielectric constant used in a multilayer capacitor may also have piezoelectric properties, such that the multilayer capacitor may vibrate minutely due to an applied voltage. The minute vibrations of the multilayer capacitor may be transmitted to a substrate connected to the multilayer capacitor, and the substrate may generate noise due to the received vibrations. This noise may be defined as acoustic noise.

Acoustic noise may stimulate the hearing of a user of the electronic device/electric device including the substrate, such that the user may mistakenly conclude that the electronic device/electric device is malfunctioning due to the noise. Also, acoustic noise may reduce performance of an acoustic input/output when the electronic device/electric device provides an acoustic input/output, and acoustic noise may act as noise on a sensor of the electronic device/electric device, such that sensitivity of the sensor may degrade. Accordingly, the reduction of acoustic noise may be required as one of various performances of a multilayer capacitor.

SUMMARY

An aspect of the present disclosure is to provide a multilayer capacitor which may reduce acoustic noise and/or a defect rate (e.g., a pinhole rate).

According to an aspect of the present disclosure, a multilayer capacitor includes a body including a laminate structure in which at least one first internal electrode and at least one second internal electrode are alternately laminated in a first direction with at least one dielectric layer interposed therebetween; first and second external electrodes spaced apart from each other and disposed on the body to be connected to the at least one first internal electrode and the at least one second internal electrode, respectively; and a noise reduction insulating layer covering one surface of the body and one surfaces of the first and second external electrodes together. A value obtained by dividing a sum of lengths of the first and second external electrodes in each of the one surfaces of the first and second external electrodes by two is defined as BW1, a length of the noise reduction insulating layer in a direction parallel to a direction of BW1 is defined as L, a thickness of each of a portion of the noise reduction insulating layer covering the body in a direction perpendicular to the one surface of the body is defined as T1, a distance from each of the one surfaces of the first and second external electrodes to the one surface of the body in a direction parallel to a direction of T1 is defined as T2, and $[\{(L*T1)-(BW1*T2)\}/(L*T1)]$ is greater than 0.9448 and less than 1.

According to an aspect of the present disclosure, a multilayer capacitor includes a body including a laminate structure in which at least one first internal electrode and at least one second internal electrode are alternately laminated in a first direction with at least one dielectric layer interposed therebetween; first and second external electrodes spaced apart from each other and disposed on the body to be connected to the at least one first internal electrode and the at least one second internal electrode, respectively; and a noise reduction insulating layer covering one surface of the body and one surfaces of the first and second external electrodes together. L, a length of the noise reduction insulating layer in a direction parallel to an opposing direction of the first and second external electrodes, is less than 1.965 mm, a thickness of each of a portion of the noise reduction insulating layer covering the body in a direction perpendicular to the one surface of the body is defined as T1, a distance of each of the one surfaces of the first and second external electrodes to the one surface of the body in a direction parallel to a direction of T1 is defined as T2, and (T2/T1) is greater than 0 and less than (23/101).

According to an aspect of the present disclosure, a multilayer capacitor includes a body including a laminate structure in which at least one first internal electrode and at least one second internal electrode are alternately laminated in a first direction with at least one dielectric layer interposed therebetween; first and second external electrodes spaced apart from each other and disposed on the body to be connected to the at least one first internal electrode and the at least one second internal electrode, respectively; a noise reduction insulating layer covering one surface of the body and one surfaces of the first and second external electrodes together; and first and second terminals spaced apart from each other and respectively disposed on the first and second external electrodes and covering portions of the noise reduction insulating layer. A portion of the first external electrode covered by the noise reduction insulating layer includes a fired layer and a conductive resin layer disposed on the fired layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
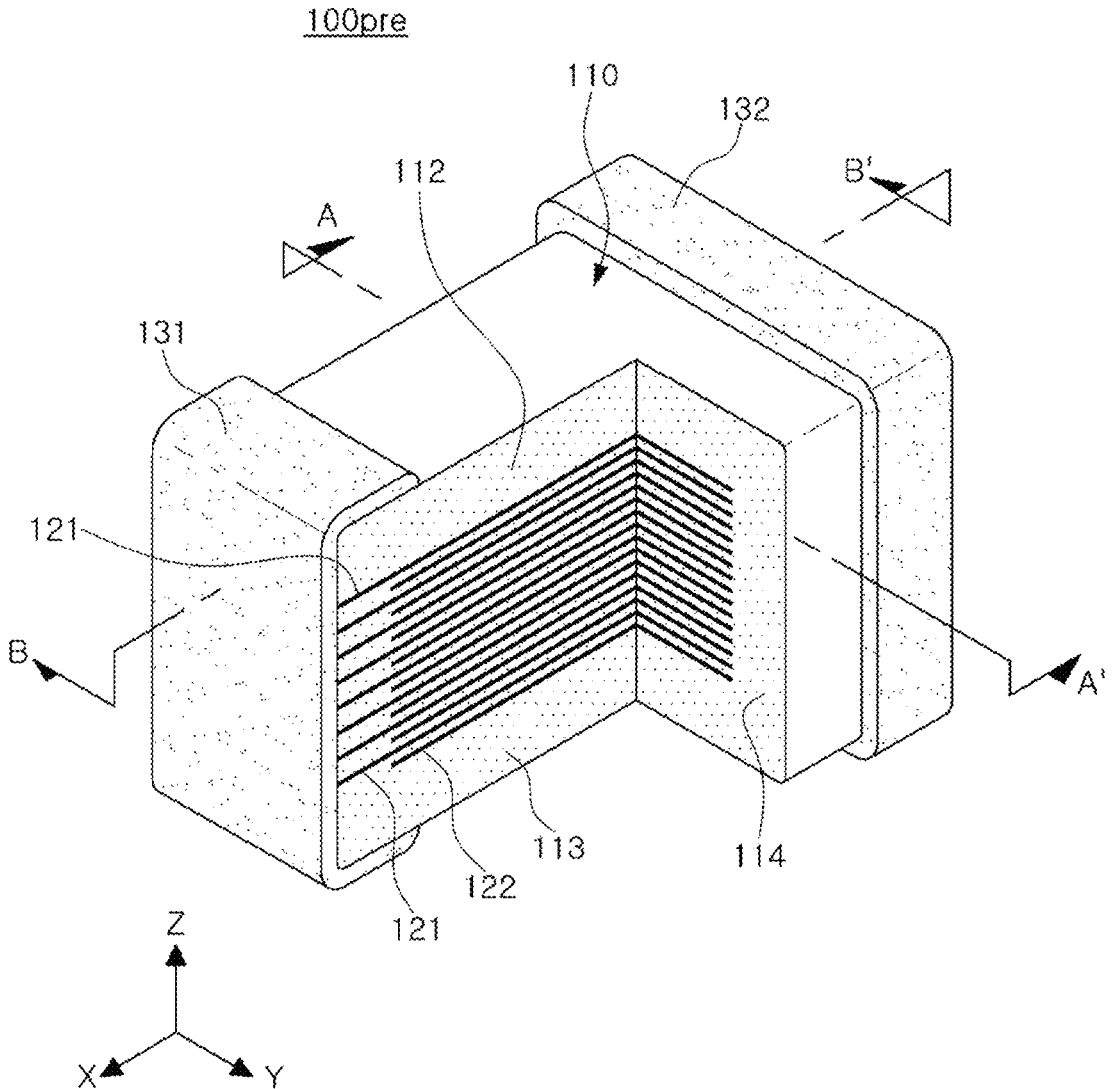
FIG. 1 is a perspective diagram illustrating a portion of a multilayer capacitor according to an example embodiment of the present disclosure.

Hereinafter, embodiments of the present disclosure will be described as follows with reference to the attached drawings.

These embodiments are described in sufficient detail to enable those skilled in the art to practice the invention. It is to be understood that the various embodiments of the invention, although different, are not necessarily mutually exclusive. For example, structures, shapes, and sizes described as examples in embodiments in the present disclosure may be implemented in another example embodiment without departing from the spirit and scope of the present disclosure. Further, modifications of positions or arrangements of elements in example embodiments may be made without departing from the spirit and scope of the present disclosure. The following detailed description is, accordingly, not to be taken in a limiting sense, and the scope of the present invention are defined only by appended claims, appropriately interpreted, along with the full range of equivalents to which the claims are entitled.

In the drawings, same elements will be indicated by same reference numerals. Also, redundant descriptions and detailed descriptions of known functions and elements that may unnecessarily make the gist of the present disclosure obscure will be omitted. In the accompanying drawings, some elements may be exaggerated, omitted or briefly illustrated, and the sizes of the elements do not necessarily reflect the actual sizes of these elements.

The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

As for the directions of a hexahedron, X, Y, and Z in the drawings may indicate a length direction, a width direction, and a thickness direction, respectively. The thickness direction may be a lamination direction (or a first direction) in which the dielectric layers are laminated.

In the description below, a multilayer capacitor according to an example embodiment will be described, and particularly, a multilayer ceramic capacitor (MLCC) will be described, but an example embodiment thereof is not limited thereto.

FIG. 1 is a perspective diagram illustrating a portion of a multilayer capacitor according to an example embodiment.

Figure 2:
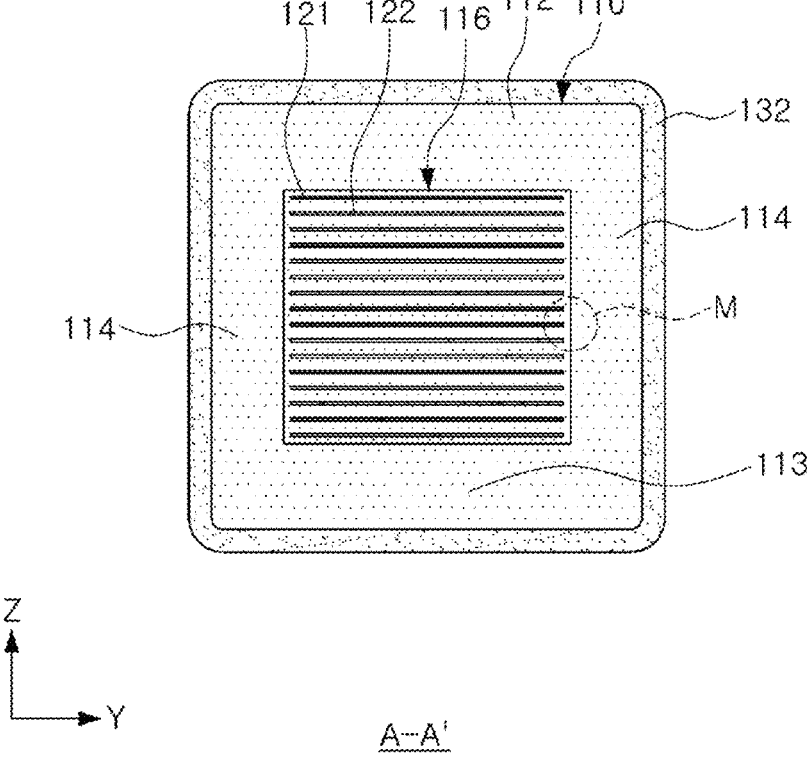
FIG. 2 is a cross-sectional diagram taken along line A-A' in FIG. 1.
Figure 3:
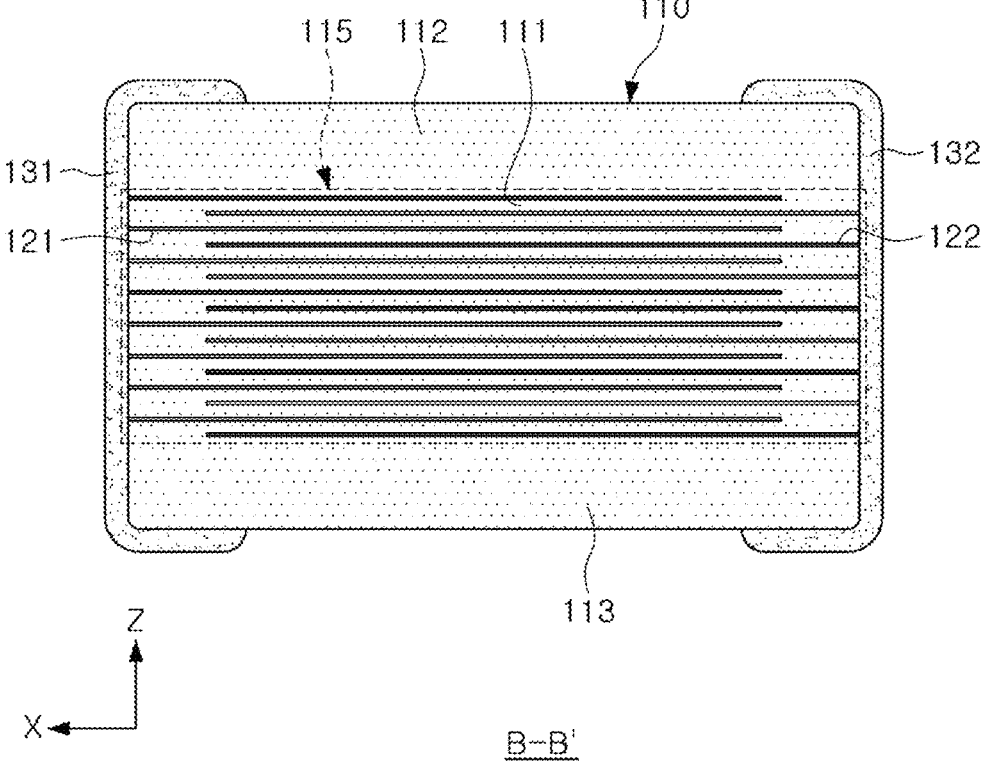
FIG. 3 is a cross-sectional diagram taken along line B-B' in FIG. 1.

FIG. 2 is a cross-sectional diagram taken along line A-A' in FIG. 1. FIG. 3 is a cross-sectional diagram taken along line B-B' in FIG. 1.

Referring to FIGS. 1, 2, and 3, a portion 100pre of a multilayer capacitor according to an example embodiment may include a body 110, a first external electrode 131, and a second external electrode 132.

The body 110 may include a laminate structure in which at least one first internal electrode 121 and at least one second internal electrode 122 are alternately laminated in a first direction (e.g., the Z direction) with at least one dielectric layer 111 interposed therebetween.

For example, the body 110 may be configured as a ceramic body by firing the laminate structure. The at least one dielectric layer 111 disposed on the body 110 may be in a sintered state, and the boundary between dielectric layers adjacent to each other may be integrated such that it may be difficult to identify a boundary therebetween without using a scanning electron microscope (SEM).

For example, the body 110 may be formed as a hexahedron having both side surfaces in the length direction X, both side surfaces in the width direction Y, and both side surfaces in the thickness direction Z. The edges and/or corners may be rounded by being polished. However, the shape and the dimensions of the body 110 and the number of laminated dielectric layers 111 are not limited to the illustrated examples.

The thickness of the at least one dielectric layer 111 may be arbitrarily changed according to the design of capacitance of the portion 100pre of the multilayer capacitor, and the dielectric layer 111 may include ceramic powder having a high dielectric constant, such as, for example, a barium titanate ($BaTiO_3$) powder, but an example embodiment thereof is not limited thereto. Also, various ceramic additives (e.g., MgO, $Al_2O_3$, $SiO_2$, ZnO), an organic solvent, a plasticizer, a binder, a dispersant, or the like, may be added to the ceramic powder according to the required configuration of the portion 100pre of the multilayer capacitor.

An average particle diameter of the ceramic powder used to form the at least one dielectric layer 111 may not be limited to any particular example, and may be adjusted according to the required configuration (e.g., miniaturization and/or high capacitance may be required as in a capacitor for electronic devices, or high withstand voltage properties and/or high strength may be required as in a capacitor for electrical devices) of the portion 100pre of the multilayer capacitor, and may be adjusted to be, for example, 400 nm or less.

For example, the at least one dielectric layer 111 may be formed by forming a plurality of ceramic sheets by applying slurry including powder such as barium titanate ($BaTiO_3$) to a carrier film and drying the slurry. The ceramic sheet may be formed by preparing the slurry by mixing ceramic powder, a binder, and a solvent, and forming the slurry into a sheet having a thickness of several μm by a doctor blade method, but an example embodiment thereof is not limited thereto.

The at least one first internal electrode 121 and the at least one second internal electrode 122 may be formed by printing a conductive paste including a conductive metal and may be alternately exposed to (or being in contact with or extend from) one side surface and the other side surface of the body 110, taken in the length direction X, in the lamination direction (e.g., the Z direction) of the dielectric layers, and may be electrically insulated from each other by the dielectric layer interposed therebetween.

For example, each of the at least one first internal electrode 121 and the at least one second internal electrode 122 may be formed by a conductive paste for internal electrodes including 40 to 50 wt % of conductive metal powder having an average particle size of 0.1 to 0.2 μm, but an example embodiment thereof is not limited thereto. The conductive paste may be nickel (Ni), copper (Cu), palladium (Pd), silver (Ag), lead (Pb), or platinum (Pt), or an alloy thereof, but an example embodiment thereof is not limited thereto.

For example, an internal electrode pattern may be formed by applying the conductive paste for an internal electrode on the ceramic sheet by a printing method. The method of printing the conductive paste may be a screen-printing method, a gravure printing method and an inkjet printing method, but an example embodiment thereof is not limited thereto. For example, the body 110 may be manufactured by laminating in 200 to 300 layers of ceramic sheets on which the internal electrode pattern is printed, and pressing and firing the ceramic sheets.

Capacitance of the portion 100pre of the multilayer capacitor may be proportional to a region of overlap between the at least one first internal electrode 121 and the at least one second internal electrode 122 in the lamination direction (e.g., in the Z-direction), may be proportional to a total number of laminated layers of the at least one first internal electrode 121 and the at least one second internal electrode 122, and may be inversely proportional to a distance between the at least one first internal electrode 121 and the at least one second internal electrode 122. The distance between the internal electrodes may be substantially the same as a thickness of each of the at least one dielectric layer 111.

The portion 100pre of the multilayer capacitor may have a larger capacitance for a thickness thereof as the distance between the at least one first internal electrode 121 and the at least one second internal electrode 122 decreases, whereas the withstand voltage of the portion 100pre of the multilayer capacitor may be higher as the distance between the internal electrodes increases. Accordingly, the distance between the internal electrodes may be adjusted according to the required configuration (e.g., miniaturization and/or high capacitance may be required as in a capacitor for electronic devices, or high withstand voltage properties and/or high strength may be required as in a capacitor for electrical devices) of the portion 100pre of the multilayer capacitor. The thickness of each of the at least one first internal electrode 121 and the at least one second internal electrode 122 may also be affected by the distance between the internal electrodes.

For example, when high withstand voltage properties and/or high strength are required for the portion 100pre of the multilayer capacitor, the distance between the at least one first internal electrode 121 and the at least one second internal electrode 122 may be configured to exceed twice the thickness of each of the first internal electrode 121 and the second internal electrode 122. For example, when high withstand voltage properties and/or high strength are required for the portion 100pre of the multilayer capacitor, the thickness of each of the at least one first internal electrode 121 and the at least one second internal electrode 122 may be configured to be 0.4 μm or less and the total number of layers of the internal electrodes may be configured to be 400 or more.

The first and second external electrodes 131 and 132 may be disposed in the body 110 to be spaced apart from each other so as to be connected to the at least one first internal electrode 121 and the at least one second internal electrode 122, respectively.

For example, each of the first and second external electrodes 131 and 132 may be formed by a method of dipping in a paste including a metal component, a method of printing a conductive paste, a sheet transfer, a pad transfer, a sputter plating method, or an electrolytic plating method. For example, the first and second external electrodes 131 and 132 may include a fired layer formed by firing the paste and a plating layer formed on an external surface of the fired layer, and a conductive resin layer may be further included between the fired layer and the plating layer. For example, the conductive resin layer may be formed as conductive particles are included in a thermosetting resin such as epoxy. The metal component may be copper (Cu), palladium (Pd), platinum (Pt), gold (Au), silver (Ag), lead (Pb), or tin (Sn), or an alloy thereof, but an example embodiment thereof is not limited thereto.

The portion 100pre of the multilayer capacitor may be mounted on or embedded in an external substrate (e.g., a printed circuit board), and may be electrically connected to a circuit (e.g., an integrated circuit, or a processor) electrically connected to the substrate 210 by being connected to at least one of a wiring, a lands, a solder, and a bump of the external substrate via the first and second external electrodes 131 and 132.

Referring to FIGS. 1, 2, and 3, the body 110 may include an upper cover layer 112, a lower cover layer 113, and a core region 115, and a core region 115 may include a margin region 114 and a capacitance region 116.

The upper and lower cover layers 112 and 113 may be disposed with the core region 115 interposed therebetween in the first direction (e.g., the T direction) and may have a thickness greater than a thickness of each of the at least one dielectric layer 111.

The upper and lower cover layers 112 and 113 may prevent external environmental elements (e.g., moisture, plating solution, foreign substances) from permeating the core region 115, may protect the body 110 from external impacts, and may also improve strength of the body 110.

For example, the upper and lower cover layers 112 and 113 may include a material the same as the material of the at least one dielectric layer 111 or a material (e.g., a thermosetting resin such as an epoxy resin) different from the material of the at least one dielectric layer 111.

The capacitance region 116 may form the capacitance of the portion 100pre of the multilayer capacitor by including a region between the at least one first internal electrode 121 and the at least one second internal electrode 122.

The capacitance region 116 may include a laminate structure in which the at least one first internal electrode 121 and the at least one second internal electrode 122 are alternately laminated in the first direction (e.g., a T-direction) with the at least one dielectric layer 111 interposed therebetween, and may have the same dimension as that of the laminate structure.

The margin region 114 may include regions between side boundary lines M of the capacitance region 116 and the side surfaces of the body 110.

The plurality of margin regions 114 may be disposed with the capacitance region 116 interposed therebetween in a second direction (e.g., the Y-direction) perpendicular to the first direction (e.g., the Z-direction). For example, the plurality of margin regions 114 may be formed by a method similar to the method of forming the at least one dielectric layer 111 (the lamination directions may be different).

The plurality of margin regions 114 may prevent the at least one first internal electrode 121 and the at least one second internal electrode 122 from exposing to the surface of the body 110 in the second direction (e.g., the Y-direction), such that the external environmental elements (e.g., moisture, plating solution, foreign substances) may be prevented from permeating the at least one first internal electrode 121 and the at least one second internal electrode 122 through the surface in the second direction, and reliability and lifespan of the portion 100pre of the multilayer capacitor may improve. Also, the at least one first internal electrode 121 and the at least one second internal electrode 122 may efficiently expand in the second direction due to the plurality of margin regions 114, and accordingly, the plurality of margin regions 114 may increase the region of overlap between the at least one first internal electrode 121 and the at least one second internal electrode 122, thereby contributing to improving the capacitance of the portion 100pre of the multilayer capacitor.

Figure 4:
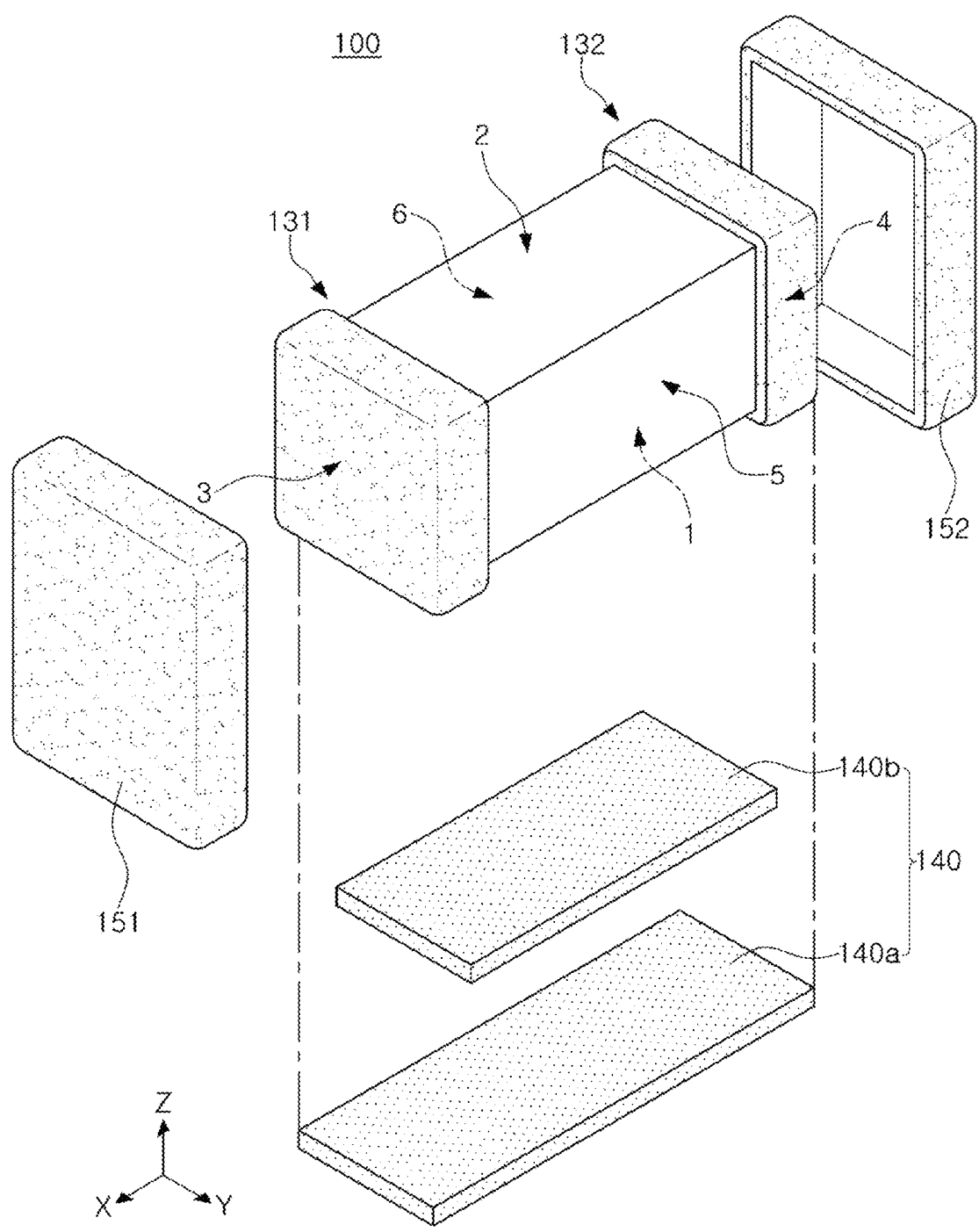
FIG. 4 is an exploded perspective diagram illustrating one portion and the other portion of a multilayer capacitor according to an example embodiment of the present disclosure.
Figure 5:
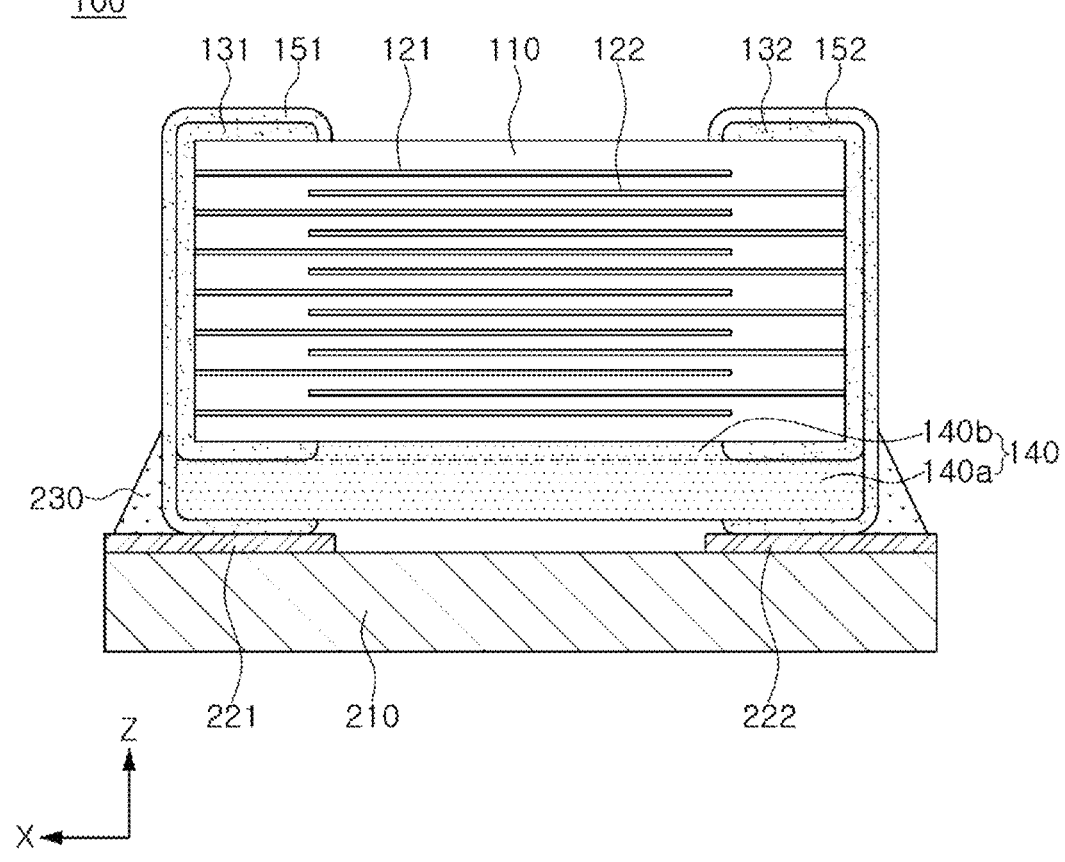
FIG. 5 is a cross-sectional diagram illustrating a multilayer capacitor according to an example embodiment of the present disclosure.

FIG. 4 is an exploded perspective diagram illustrating one portion and the other portion of a multilayer capacitor according to an example embodiment. FIG. 5 is a cross-sectional diagram illustrating a multilayer capacitor according to an example embodiment.

Referring to FIGS. 4 and 5, the multilayer capacitor 100 in an example embodiment may include a body 110, first and second external electrodes 131 and 132, and a noise reduction insulating layer 140.

The body 110 may a hexahedral shape including first, second, third, fourth, fifth and sixth surfaces 1, 2, 3, 4, 5, and 6, but an example embodiment thereof is not limited thereto. The first surface 1 may be defined as a surface opposing the substrate 210 to which the multilayer capacitor 100 is connected. The third and fourth surfaces 3 and 4 may be surfaces on which at least one first internal electrode and at least one second internal electrode are connected to the first and second external electrodes 131 and 132 of the body 110, and may not be parallel to the first surface 1. The first surface 1 may be parallel to the upper surface and/or the lower surface of the noise reduction insulating layer 140.

The multilayer capacitor 100 may be mounted on the first and second pads 221 and 222 of the substrate 210 to be disposed on the first and second external electrodes 131 and 132, and solder 230 may be disposed to connect the first and second external electrodes 131 and 132 to the first and second pads 221 and 222 through a reflow process and may fix the first and second external electrodes 131 and 132 and the first and second pads 221 and 222. The solder 230 may have a melting point lower than that of copper (Cu) contained in the first and second external electrodes 131 and 132, and may include tin (Sn) or a tin-based alloy.

The noise reduction insulating layer 140 may cover one surface (e.g., the first surface 1) of the body 110 and one surface (e.g., the lower surface) of the first and second external electrodes 131 and 132 together. For example, the noise reduction insulating layer 140 may include a cover portion 140a and a protrusion portion 140b, and the cover portion 140a may be integrated with the protrusion portion 140b. The protrusion 140b may be disposed between the first and second external electrodes 131 and 132.

Differently from the dielectric layer of the body 110, the noise reduction insulating layer 140 may not substantially contribute to capacitance, and accordingly, it may not be necessary for the noise reduction insulating layer 140 to have a high dielectric constant. That is, the noise reduction insulating layer 140 may include an insulating material having low piezoelectricity or no piezoelectricity as compared to the dielectric layer of the body 110, and may reduce acoustic noise.

Also, since the noise reduction insulating layer 140 may cover the lower surface of the body 110 and also the lower surfaces of the first and second external electrodes 131 and 132, the upper surface and/or the lower surface of the noise reduction insulating layer 140 may increase. Accordingly, the noise reduction insulating layer 140 may have a large volume for a unit thickness, and noise reduction performance of the noise reduction insulating layer 140 may be proportional to the volume, such that the noise reduction insulating layer 140 may efficiently reduce acoustic noise.

Also, a portion of the noise reduction insulating layer 140 overlapping the first and second external electrodes 131 and 132 in the Z-direction may greatly affect acoustic impedance between the first and second external electrodes 131 and 132 and the first and second pads 221 and 222, such that efficiency at which the vibrations of the body 110 are transmitted to the other structure may be reduced, and acoustic noise may be reduced.

For example, the noise reduction insulating layer 140 may have a Young's modulus lower than a Young's modulus of the dielectric layer of the body 110. Accordingly, a portion of stress caused by the vibration of the body 110 may be absorbed by the noise reduction insulating layer 140, such that acoustic noise may be reduced. Also, the absorption of stress according to the relatively low Young's modulus of the noise reduction insulating layer 140 may also contribute to preventing cracks caused by the stress of the body 110, such that the strength of the body 110 may improve.

For example, the noise reduction insulating layer 140 may include epoxy resin. A Young's modulus of the epoxy resin may be 3.8 GPa, and a Young's modulus of the barium titanate ($BaTiO_3$) dielectric layer may be 135 GPa.

Referring to FIGS. 4 and 5, the multilayer capacitor 100 in an example embodiment may further include first and second terminals 151 and 152 spaced apart from each other and disposed on the first and second external electrodes 131 and 132.

A first portion of the noise reduction insulating layer 140 may be disposed between the first external electrode 131 and the first terminal 151, and a second portion of the noise reduction insulating layer 140 may be disposed between the second external electrode 132 and the second terminal 152. The first and second terminals 151 and 152 may stably provide an electrical connection path between the multilayer capacitor 100 and the first and second pads 221 and 222, and may prevent the separation from the first and second external electrodes 131 and 132 on the edge of the noise reduction insulating layer 140 in advance.

Edge portions of the noise reduction insulating layer 140 may not overlap the body 110 in a direction (e.g., the Z-direction) perpendicular to one surface (e.g., the first surface 1) of the body 110. Accordingly, a step difference between the side surface of the noise reduction insulating layer 140 and the side surfaces of the first and second external electrodes 131 and 132 may be prevented in advance.

Figure 6:
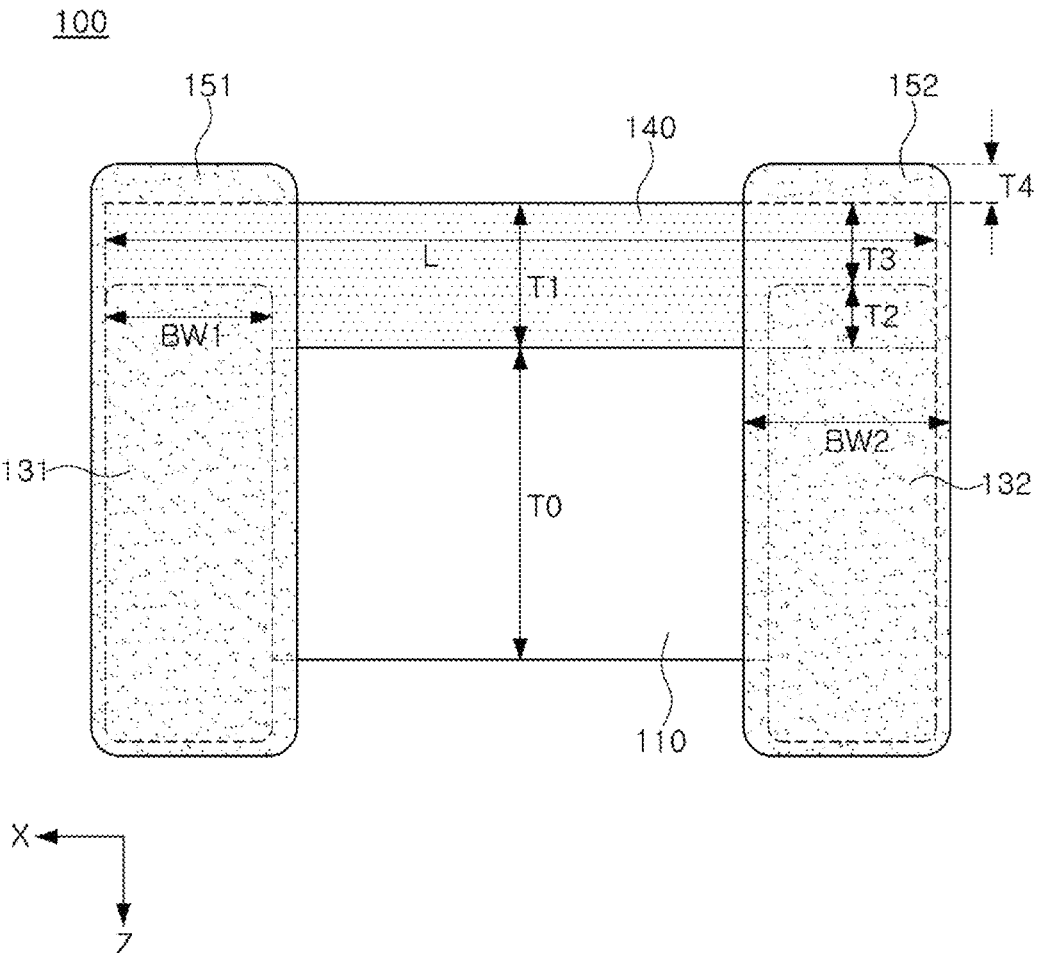
FIG. 6 is a diagram schematically illustrating dimensions of a multilayer capacitor according to an example embodiment of the present disclosure, viewed from the side.

FIG. 6 is a diagram schematically illustrating dimensions of a multilayer capacitor according to an example embodiment, viewed from the side.

Referring to FIG. 6, a value obtained by dividing a sum of lengths of the first and second external electrodes 131 and 132 by two may be defined as BW1 in an opposing direction (e.g., the X-direction) on one surfaces of the first and second external electrodes 131 and 132. A value obtained by dividing the sum of the lengths of the first and second terminals 151 and 152 by two may be defined as BW2 in a direction (e.g., X-direction) opposing each other on one surfaces of the first and second terminals 151 and 152. The length of the noise reduction insulating layer 140 may be defined as L in a direction (e.g., the X-direction) parallel to the direction of BW1.

Alternatively, the X-Y plane, a reference for measuring L, may include a central point between one surfaces of the first and second external electrodes 131 and 132 and one surfaces of the first and second terminals 151 and 152, the X-Y plane, a reference for measuring BW1, may include the central point of each of the first and second external electrodes 131 and 132, and the X-Y plane, a reference for measuring BW2, may include a central point of each of the first and second terminals 151 and 152. Each of L, BW1, and BW2 may be measured by cutting or grinding the multilayer capacitor for the measurement to expose the corresponding X-Y plane, and may be measured as an average size of the portion of the corresponding X-Y plane to which the corresponding size (e.g., L, BW1, and BW2) may be applied.

Referring to FIG. 6, the thickness of the portion of the noise reduction insulating layer 140 covering the body 110 may be defined as T1 in a direction (e.g., the Z-direction) perpendicular to one surface of the body 110. The thickness of each of one surfaces of the first and second external electrodes 131 and 132 may be defined as T2 in a direction (e.g., the Z-direction) parallel to the direction of T1. For example, a distance of each of the one surfaces of the first and second external electrodes 131 and 132 to the one surface of the body 110 in a direction parallel to a direction of T1 may be defined as T2. A portion of the noise reduction insulating layer 140 disposed between the first and second external electrodes 131 and 132 and the first and second terminals 151 and 152 may be defined as T3 in a direction (e.g., the Z-direction) parallel to the direction of T1. The thickness of one surfaces of the first and second terminals 151 and 152 may be defined as T4 in a direction (e.g., the Z-direction) parallel to the direction of T1. The thickness of the center of the body 110 may be defined as T0 in a direction (e.g., the Z-direction) parallel to the direction of T1.

The Y-Z plane, a reference for measuring T1, may include a central point of the body 110, the Y-Z plane, a reference for measuring T2 and T3, may include a central point of each of the first and second external electrodes 131 and 132, and the Y-Z plane, a reference for measuring T4, may include a central point of each of the first and second terminals 151 and 152.

Alternatively, the Y-Z plane, a reference for measuring L, may include a central point between one surfaces of the first and second external electrodes 131 and 132 and one surfaces of the first and second terminals 151 and 152, the Y-Z plane, a reference for measuring BW1, may include a central point of each of the first and second external electrodes 131 and 132, and a Y-Z plane, a reference for measuring BW2, may include a central point of each of the first and second terminals 151 and 152. Each of T0, T1, T2, T3, and T4 may be measured by cutting or grinding the multilayer capacitor for measurement to expose the corresponding Y-Z plane, and may be measured as an average size of the portion of the corresponding Y-Z plane to which the corresponding size (e.g., T0, T1, T2, T3, and T4) are applied.

TABLE 1

| | L | T1 | BW1 | T2 | L * T1 − BW1 * T2 | (L * T1 − BW1 * T2)/ (L * T1) | A.N. AVG | Pin-hole test |
|---|---|---|---|---|---|---|---|---|
| 1 | 1.172 | 1.103 | 0 | 0 | 0.12072 | 1.0000 | 22.7 | OK |
| 2 | 1.171 | 0.111 | 0.008 | 0.003 | 0.12996 | 0.9998 | 23.2 | OK |
| 3 | 1.173 | 0.107 | 0.012 | 0.003 | 0.12548 | 0.9997 | 23.1 | OK |
| 4 | 1.179 | 0.108 | 0.053 | 0.003 | 0.12717 | 0.9988 | 23.3 | OK |
| 5 | 1.186 | 0.102 | 0.068 | 0.005 | 0.12063 | 0.9972 | 23.5 | OK |
| 6 | 1.182 | 0.103 | 0.171 | 0.007 | 0.12055 | 0.9902 | 24.4 | OK |
| 7 | 1.176 | 1.103 | 0.291 | 0.015 | 0.11676 | 0.9640 | 24.4 | OK |
| 8 | 1.183 | 0.101 | 0.287 | 0.023 | 0.11288 | 0.9448 | 26.7 | NG |
| 9 | 1.188 | 0.098 | 0.322 | 0.03 | 0.10676 | 0.9170 | 26.6 | NG |
| 10 | 1.172 | 0.103 | 0.3 | 0.037 | 0.10962 | 0.9080 | 27.0 | NG |

Table 1 above lists results of measurement of 10 samples of a multilayer capacitor having a length taken in an X-direction and a width taken in Y-direction to be 1.0 mm and 0.5 mm, respectively, Table 2 below lists results of measurement of 8 samples of a multilayer capacitor having a length taken in an X-direction and a width taken in Y-direction to be 1.6 mm and 0.8 mm, respectively, and Table 3 below lists results of measurement of 6 samples of a multilayer capacitor having a length taken in an X-direction and a width taken in Y-direction to be 2.0 mm and 1.2 mm, respectively.

In Tables 1, 2, and 3, units of L, T1, BW1, and T2 may be mm, A.N. AVG may be acoustic noise, the unit of A.N. AVG may be dB, OK in the pinhole test indicates that there was no pinhole, and NG in the pinhole test indicates that there is a pinhole. A multilayer capacitor without a pinhole may be less likely to be determined as defective than a multilayer capacitor having a pinhole. The noise reduction insulating layer in Tables 1, 2, and 3 may include epoxy resin.

TABLE 2

| | L | T1 | BW1 | T2 | L * T1 − BW1 * T2 | (L * T1 − BW1 * T2)/ (L * T1) | A.N. AVG | Pin-hole test |
|---|---|---|---|---|---|---|---|---|
| 11 | 1.686 | 0.151 | 0 | 0 | 0.25459 | 1.0000 | 33.3 | OK |
| 12 | 1.697 | 0.157 | 0.007 | 0.002 | 0.26642 | 0.9999 | 33.6 | OK |
| 13 | 1.696 | 0.153 | 0.077 | 0.006 | 0.25903 | 0.9982 | 34.1 | OK |
| 14 | 1.682 | 0.153 | 0.102 | 0.007 | 0.25663 | 0.9972 | 34.5 | OK |
| 15 | 1.706 | 0.151 | 0.315 | 0.025 | 0.24973 | 0.9694 | 34.7 | OK |
| 16 | 1.743 | 0.15 | 0.327 | 0.026 | 0.25295 | 0.9675 | 35.0 | OK |
| 17 | 1.728 | 0.146 | 0.429 | 0.035 | 0.23727 | 0.9405 | 36.2 | NG |
| 18 | 1.712 | 0.151 | 0.465 | 0.047 | 0.23666 | 0.9155 | 36.3 | NG |

TABLE 3

| | L | T1 | BW1 | T2 | L * T1 − BW1 * T2 | (L * T1 − BW1 * T2)/ (L * T1) | A.N. AVG | Pin-hole test |
|---|---|---|---|---|---|---|---|---|
| 19 | 2.073 | 0.207 | 0.008 | 0.003 | 0.42909 | 0.9999 | 37.4 | OK |
| 20 | 1.965 | 0.231 | 0.031 | 0.002 | 0.45385 | 0 9999 | 38.7 | OK |
| 21 | 2.07 | 0,222 | 0.102 | 0.008 | 0.45872 | 0.9982 | 40.2 | OK |
| 22 | 2.011 | 0.207 | 0.217 | 0.020 | 0.41194 | 0.9896 | 40.9 | OK |
| 23 | 2.067 | 0.206 | 0.312 | 0.044 | 0.41207 | 0.9678 | 40.1 | OK |
| 24 | 2.034 | 0.205 | 0.424 | 0.049 | 0.39619 | 0.9502 | 41.5 | OK |

TABLE 4

| | A.N. AVG | SPL1 | SPL2 | SPL3 | SPL4 | SPL5 |
|---|---|---|---|---|---|---|
| 1 | 22.7 | 21.6 | 23.3 | 24.7 | 21 4 | 22.5 |
| 2 | 23.2 | 23.1 | 24.2 | 22.4 | 23.7 | 22.6 |

11

TABLE 4-continued

| | A.N. AVG | SPL1 | SPL2 | SPL3 | SPL4 | SPL5 |
|---|---|---|---|---|---|---|
| 3 | 23.1 | 24.2 | 22.8 | 23.7 | 21.9 | 22.8 |
| 4 | 23.3 | 24.4 | 23.7 | 22.3 | 23.2 | 22.8 |
| 5 | 23.5 | 22.5 | 23.3 | 24.0 | 24.5 | 23.2 |
| 6 | 24.4 | 25.0 | 24.8 | 23.4 | 25.3 | 23.5 |
| 7 | 24.4 | 24.1 | 23.0 | 25.0 | 25.2 | 24.8 |
| 8 | 26.7 | 25.8 | 27.2 | 26.3 | 24.5 | 29.7 |
| 9 | 26.6 | 27.3 | 25.8 | 28.7 | 26.3 | 24.9 |
| 10 | 27.0 | 27.7 | 25.3 | 27.7 | 26.8 | 27.5 |
| 11 | 33.3 | 32.2 | 33.7 | 33.2 | 34.3 | 33.2 |
| 12 | 33.6 | 32.9 | 32.5 | 35.4 | 34.2 | 33.1 |
| 13 | 34.1 | 34.2 | 35.5 | 35.8 | 32.3 | 32.7 |
| 14 | 34.5 | 34.5 | 34.7 | 34.3 | 34.7 | 34.4 |
| 15 | 34.7 | 36.4 | 34 | 36.2 | 32.1 | 34.8 |
| 16 | 35.0 | 34.4 | 34.3 | 36.4 | 35.1 | 34.6 |
| 17 | 36.2 | 38.2 | 35.1 | 34.8 | 35.2 | 37.8 |
| 18 | 36.3 | 35.6 | 35.2 | 38.1 | 36.9 | 35.8 |
| 19 | 37.4 | 38.4 | 36.2 | 36.9 | 36.2 | 39.3 |
| 20 | 38.7 | 40.4 | 36.3 | 40.1 | 36.7 | 39.9 |
| 21 | 40.2 | 40.5 | 41 | 40.8 | 40.4 | 38.3 |
| 22 | 40.9 | 40 | 39.8 | 42 | 41.7 | 40.8 |
| 23 | 40.1 | 39.7 | 39.3 | 39.2 | 42.1 | 40.1 |
| 24 | 41.5 | 42.1 | 41.5 | 41.5 | 42.1 | 40.4 |

Table 4 above lists acoustic noise of 120 measurement samples (SPL) corresponding to five measurement samples for 24 samples in Tables 1, 2, and 3 and an average (A.N. AVG) of acoustic noise of five measurement samples.

Referring to Tables 1, 2, and 3, as [{(L*T1)–(BW1*T2)}/(L*T1)] increases, the average of acoustic noise (AN AVG) may be lowered.

When [{(L*T1)–(BW1*T2)}/(L*T1)] is 1, the first and second external electrodes 131 and 132 may not be disposed on the lower surface (the first surface), such that placement stability. (e.g., prevention of external electrode from peeling, prevention of a moisture penetration path caused by the exposed corners of the body) of the first and second external electrodes 131 and 132 with respect to the body 110 may not be secured. For example, when [{(L*T1)–(BW1*T2)}/(L*T1)] is 0.9998 or less, the first and second external electrodes 131 and 132 may be disposed on the lower surface (the first surface).

The maximum value of [{(L*T1)–(BW1*T2)}/(L*T1)] of the sample (NG in the pinhole test) having a pinhole among the 24 samples in Tables 1, 2, and 3 may be 0.9448. The pinhole may be formed by a step difference in the noise reduction insulating layer 140 and/or an air trap caused by an excessively increased portion (between the body and the noise reduction insulating layer) of the first and second external electrodes 131 and 132.

Accordingly, the multilayer capacitor in an example embodiment may have [{(L*T1)–(BW1*T2)}/(L*T1)] greater than 0.9448 and less than 1, thereby securing performance of reducing acoustic noise and also performance of preventing defects due to no pinhole, and placement stability of the external electrode may also be secured.

The minimum value of [{(L*T1)–(BW1*T2)}/(L*T1)] of a sample without a pinhole (OK in the pinhole test) among the 24 samples in Tables 1, 2, and 3 may be 0.9502.

Accordingly, when the multilayer capacitor in an example embodiment has [{(L*T1)–(BW1*T2)}/(L*T1)] of 0.9502 or more, a pinhole may not be formed, such that performance of preventing defects may be reliably secured.

The minimum value of L in Table 3 may be 1.965 mm, and [{(L*T1)–(BW1*T2)}/(L*T1)] of a sample without a pinhole (OK in the pinhole test) among 18 samples in Tables 1 and 2 may be 0.964. Accordingly, when L is less than 1.965 mm, the pinhole may not be formed when the multilayer capacitor in an example embodiment has [{(L*T1)–(BW1*T2)}/(L*T1)] to be 0.964 or more, such that the multilayer capacitor may reliably secure performance of preventing defects.

The maximum value of L in Table 1 may be 1.188 mm, and a minimum value of [{(L*T1)–(BW1*T2)}/(L*T1)] of the sample (OK in the pinhole test) without a pinhole among eight samples in Table 2 may be 0.975. Accordingly, when L is greater than 1.188 mm and less than 1.965 mm, the pinhole may not be formed when the multilayer capacitor in an example embodiment has [{(L*T1)–(BW1*T2)}/(L*T1)] to be 0.975 or more, such that the multilayer capacitor may reliably secure performance of preventing defects.

Referring to Tables 1, 2, and 3, as (T2/T1) increases, the average (A.N. AVG) of acoustic noise may decrease.

When (T2/T1) is 0, since the first and second external electrodes 131 and 132 are not disposed on the lower surface (first surface) of the body 110, placement stability (e.g., prevention of external electrodes from peeling, prevention of moisture penetration path caused by the exposed corners of body) may not be secured.

The maximum value of (T2/T1) of the sample with a pinhole (NG in the pinhole test) among the 24 samples in Tables 1, 2, and 3 may be (23/101).

Accordingly, the multilayer capacitor in an example embodiment may have (T2/T1) greater than 0 and less than (23/101), thereby securing performance of reducing acoustic noise and also performance of preventing defects due to no pinhole, and placement stability of the external electrode may also be secured.

The minimum value of (T2/T1) of the sample without a pinhole (OK in the pinhole test) among the 24 samples in Tables 1, 2, and 3 may be (26/150).

Accordingly, when the multilayer capacitor in an example embodiment has (T2/T1) of (26/150) or less, no pinhole may be formed such that the performance of preventing defects may be stably secured.

The minimum value of L in Table 2 may be 1.682 mm, and the minimum value of (T2/T1) of a sample without a pinhole (OK in the pinhole test) among 10 samples in Table 1 may be (15/103). Accordingly, when L is less than 1.682 mm, the multilayer capacitor in an example embodiment may not have a pinhole when (T2/T1) is less than (15/103), such that the performance in preventing defects may be stably secured.

L, T1, BW1, and T2 in Tables 1, 2, 3 may be measured through an analysis using at least one of a micrometer, transmission electron microscopy (TEM), atomic force microscope (AFM), scanning electron microscope (SEM), an optical microscope and a surface profiler. Acoustic noise may be measured by mounting the multilayer capacitor 100 on a substrate in an anechoic chamber and applying a voltage through the substrate. The pinhole test may be to identify whether a pinhole is formed by printing the noise reduction insulating layer 140 the first surface of the body 110 and drying the noise reduction insulating layer 140 under drying conditions the (e.g., the drying conditions provided by the epoxy manufacturer) appropriate for the specifications of the noise reduction insulating layer 140.

FIGS. 7A to 7D are images of "good" (OK) and "bad" (NG) states of noise reduction insulating layers of a multilayer capacitor according to an example embodiment.

Figure 7A:
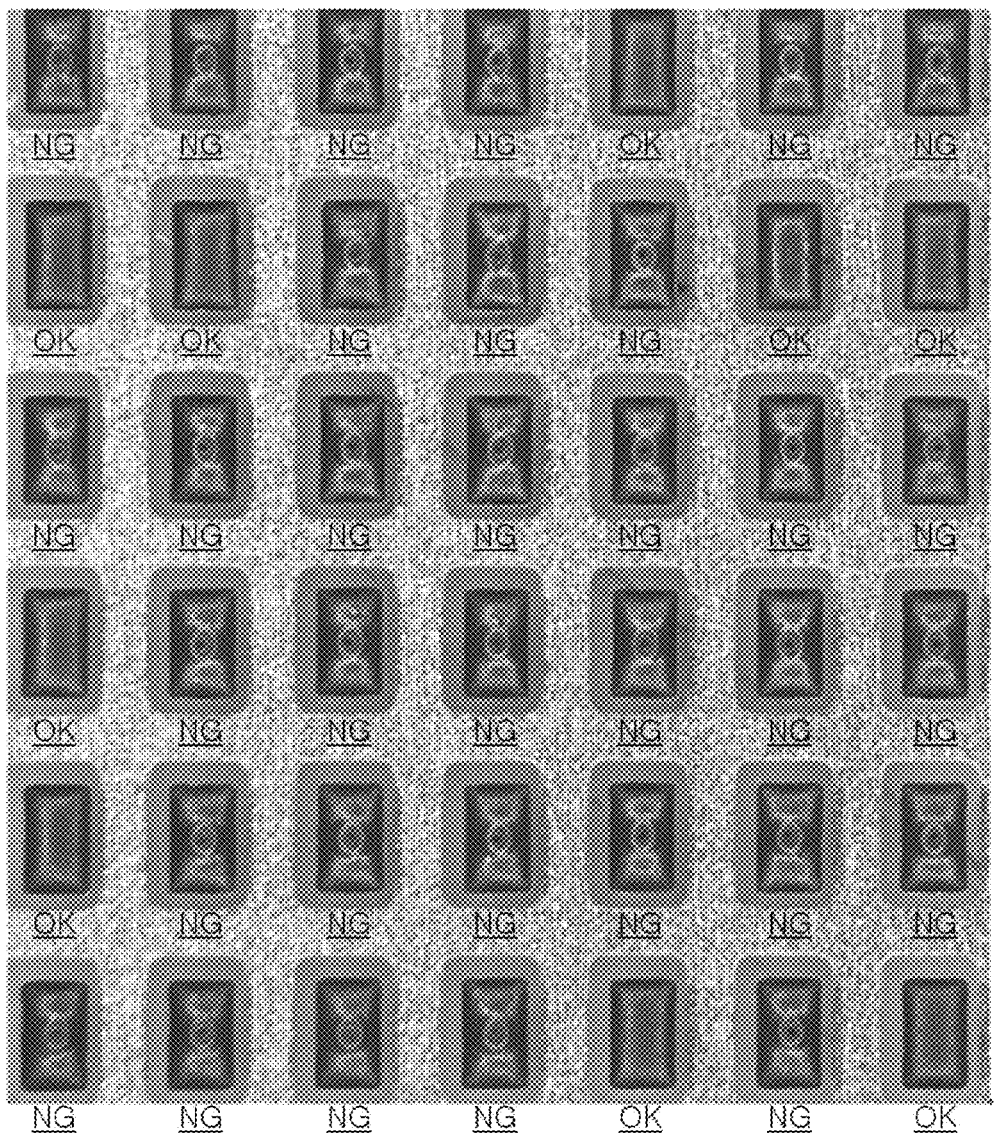
FIGS. 7A to 7D are images of "good" (OK) and "bad" (NG) states of a noise reduction insulating layer of a multilayer capacitor according to an example embodiment of the present disclosure.
Figure 7B:
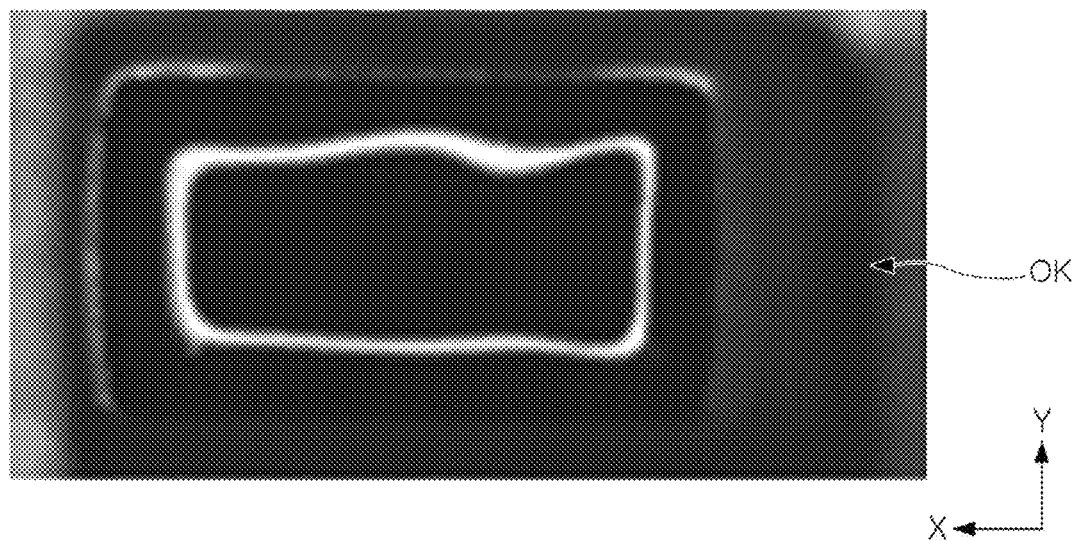
Figure 7C:
Figure 7D:
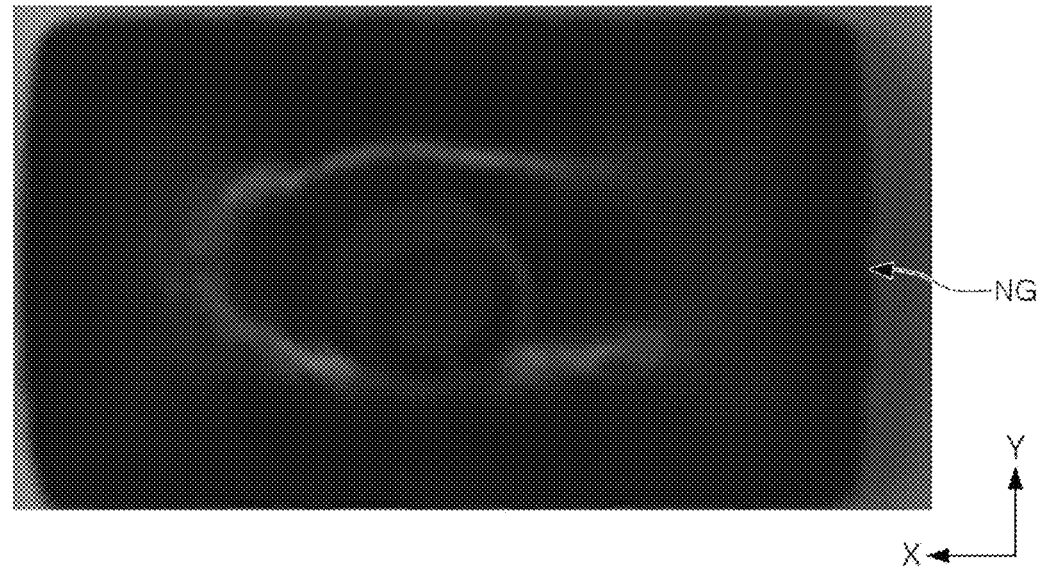

Referring to FIG. 7A, 42 multilayer capacitors for measurement may be prepared in total.

FIGS. 7A to 7D illustrate an example of determining whether no pinhole is present in the sample (OK) without a pinhole and an example of determining whether a pinhole is present in the sample (NG) having a pinhole.

The number of samples is not limited to 42, and may be 24 or 1000.

Figure 8A:
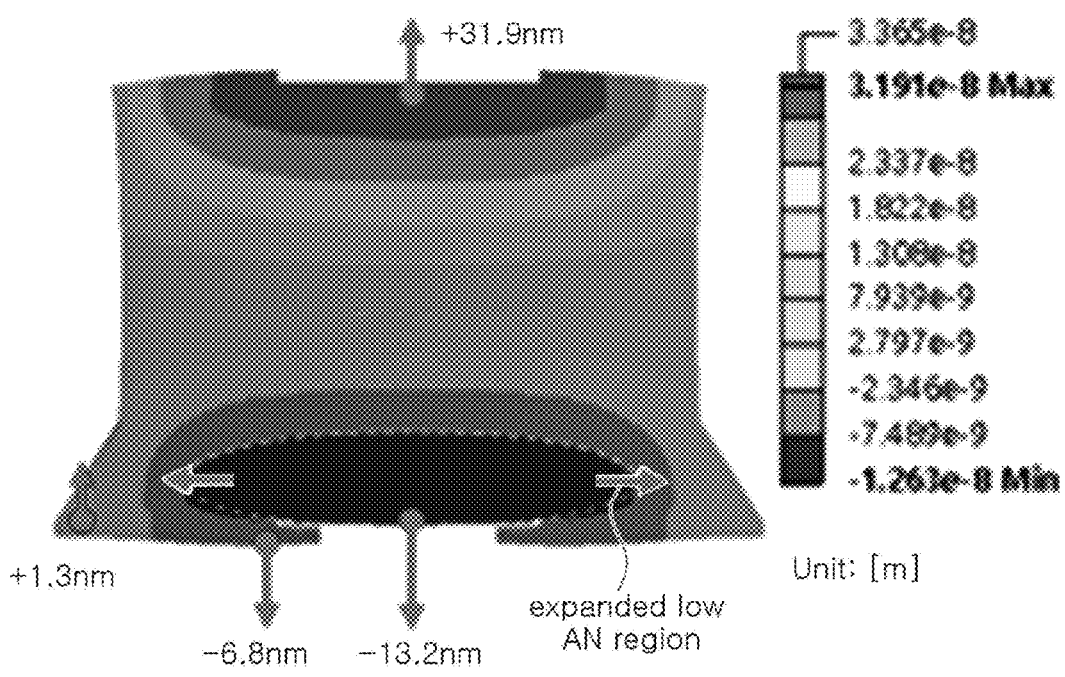
FIG. 8A is a diagram illustrating an example in which a noise reduction insulating layer of a multilayer capacitor expands a noise reduction area according to an example embodiment of the present disclosure.
Figure 8B:
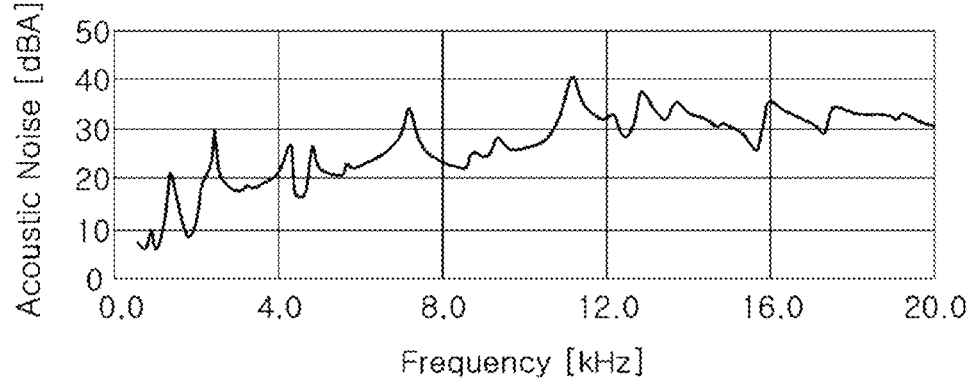
FIGS. 8B to 8D are graphs illustrating reduced noise of a multilayer capacitor according to an example embodiment of the present disclosure.
Figure 8C:
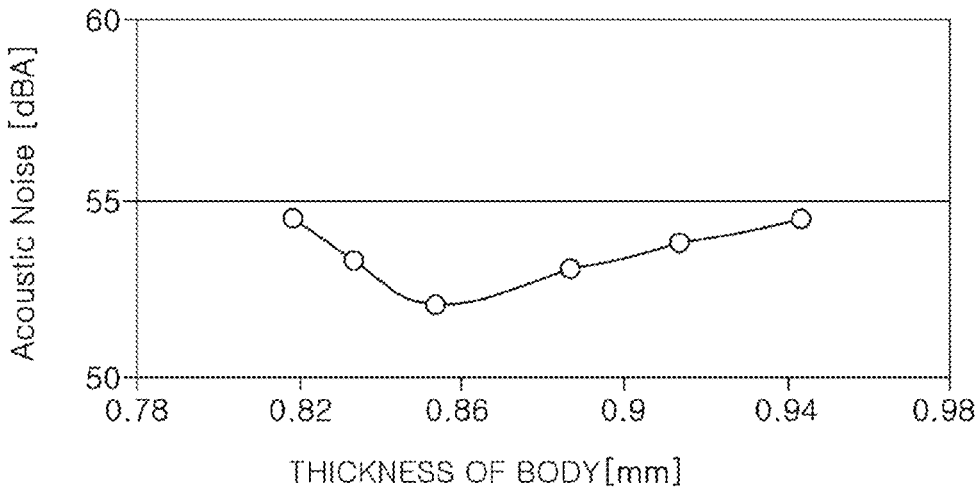
Figure 8D:
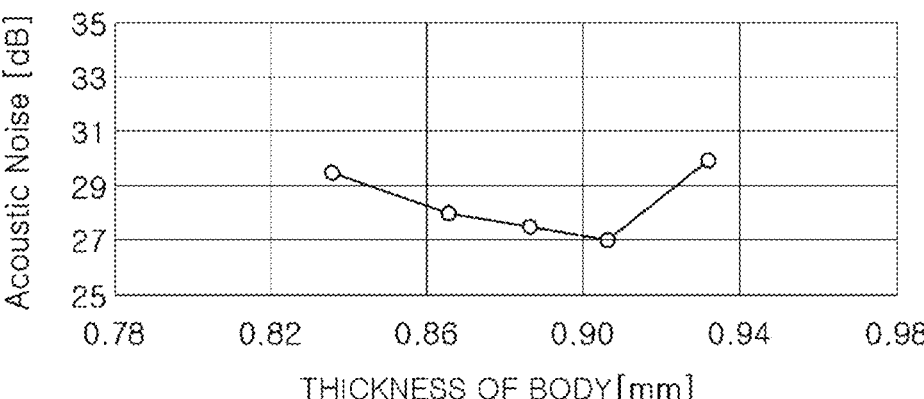

FIG. 8A is a diagram illustrating an example in which a noise reduction insulating layer of a multilayer capacitor expands a noise reduction area according to an example embodiment. FIGS. 8B to 8D are graphs illustrating reduced noise of a multilayer capacitor according to an example embodiment.

Referring to FIG. 8A, since the noise reduction insulating layer covers the body and the external electrode together, the noise reduction insulating layer may have a large area in the horizontal direction. Accordingly, the noise reduction insulating layer may provide an expanded low AN region.

Referring to FIG. 8B, the acoustic noise of the multilayer capacitor having the expanded low AN region in FIG. 8A may be provided in a spectrum in the frequency range of 0 to 20 kHz, may be calculated as an average value of the vertical axis, and may be generally lowered in the frequency range of 0 to 20 KHz.

Referring to FIGS. 8C and 8D, the acoustic noise of the multilayer capacitor having the expanded low AN region in FIG. 8A may vary depending on the thickness (Z-direction) of the body 110, and may be lowered in a wide range of thickness of the body 110.

According to the aforementioned example embodiments, a multilayer capacitor which may reduce acoustic noise and/or a defect rate (e.g., a pinhole rate).

While the example embodiments have been illustrated and described above, it will be apparent to those skilled in the art that modifications and variations could be made without departing from the scope of the present invention as defined by the appended claims.

What is claimed is:

1. A multilayer capacitor, comprising:

a body including a laminate structure in which at least one first internal electrode and at least one second internal electrode are alternately laminated in a first direction with at least one dielectric layer interposed therebetween;

first and second external electrodes spaced apart from each other and disposed on the body to be connected to the at least one first internal electrode and the at least one second internal electrode, respectively; and a noise reduction insulating layer covering one surface of the body and one surfaces of the first and second external electrodes together, wherein a value obtained by dividing a sum of lengths of the first and second external electrodes in each of the one surfaces of the first and second external electrodes by two is defined as BW1, wherein a length of the noise reduction insulating layer in a direction parallel to a direction of BW1 is defined as L, wherein a thickness of a portion of the noise reduction insulating layer covering the body in a direction perpendicular to the one surface of the body is defined as T1, wherein a distance from each of the one surfaces of the first and second external electrodes to the one surface of the body in a direction parallel to a direction of T1 is defined as T2, and wherein $[\{(L*T1)-(BW1*T2)\}/(L*T1)]$ is greater than 0.9448 and less than 1.

2. The multilayer capacitor of claim 1, further comprising:

first and second terminals spaced apart from each other and respectively disposed on the first and second external electrodes, wherein a first portion of the noise reduction insulating layer is disposed between the first external electrode and the first terminal, and a second portion of the noise reduction insulating layer is disposed between the second external electrode and the second terminal.

3. The multilayer capacitor of claim 1, wherein a surface of the body on which the at least one first internal electrode is connected to the first external electrode and a surface of the body on which the at least one second internal electrode is connected to the second external electrode are not parallel to the one surface of the body covered by the noise reduction insulating layer.

4. The multilayer capacitor of claim 1, wherein the noise reduction insulating layer has a Young's modulus lower than a Young's modulus of the at least one dielectric layer.

5. The multilayer capacitor of claim 4, wherein the noise reduction insulating layer includes epoxy resin.

6. The multilayer capacitor of claim 1, wherein edge portions of the noise reduction insulating layer does not overlap the body in a direction perpendicular to the one surface of the body.

7. The multilayer capacitor of claim 1, wherein $[\{(L*T1)-(BW1*T2)\}/(L*T1)]$ is 0.9502 or greater.

8. The multilayer capacitor of claim 7, wherein L is less than 1.965 mm, and wherein $[\{(L*T1)-(BW1*T2)\}/(L*T1)]$ is 0.964 or greater.

9. The multilayer capacitor of claim 8, wherein L is greater than 1.188 mm, and wherein $[\{(L*T1)-(BW1*T2)\}/(L*T1)]$ is 0.975 or greater.

10. A multilayer capacitor, comprising:

a body including a laminate structure in which at least one first internal electrode and at least one second internal electrode are alternately laminated in a first direction with at least one dielectric layer interposed therebetween so as to define a region in which the first and second internal electrodes do not overlap each other in the first direction;

first and second external electrodes spaced apart from each other and disposed on the body to be connected to the at least one first internal electrode and the at least one second internal electrode, respectively; and a noise reduction insulating layer disposed on one mounting surface of the body and one surfaces of the first and second external electrodes together, extends beyond opposing surfaces of the body in a second direction perpendicular to the first direction, and including a peripheral portion overlapping at least a central portion of said region in the first direction, wherein L, a length of the noise reduction insulating layer in a direction parallel to an opposing direction of the first and second external electrodes, is less than 1.965 mm, wherein a thickness of a portion of the noise reduction insulating layer covering the body in a direction perpendicular to the one surface of the body is defined as T1, wherein a distance of each of the one surfaces of the first and second external electrodes to the one surface of the body in a direction parallel to a direction of T1 is defined as T2, wherein (T2/T1) is greater than 0 and less than (23/101), wherein a thickness of the peripheral portion is greater than T2, wherein a portion of the first external electrode covered by the noise reduction insulating layer includes a fired layer and a conductive resin layer disposed on the fired layer, and wherein another surface of the body opposite the one surface of the body in the first direction is devoid of any noise reduction insulating layer.

11. The multilayer capacitor of claim 10, wherein (T2/T1) is equal to or less than (26/150).

12. The multilayer capacitor of claim 11, wherein L is less than 1.682 mm, and wherein (T2/T1) is equal to or less than (15/103).

13. The multilayer capacitor of claim 10, wherein T1 is less than 200 μm.

14. The multilayer capacitor of claim 10, further comprising:

first and second terminals spaced apart from each other and respectively disposed on the first and second external electrodes, wherein a first portion of the noise reduction insulating layer is disposed between the first external electrode and the first terminal, and a second portion of the noise reduction insulating layer is disposed between the second external electrode and the second terminal.

15. The multilayer capacitor of claim 10, wherein a surface of the body on which the at least one first internal electrode is connected to the first external electrode and a surface of the body on which the at least one second internal electrode is connected to the second external electrode is not parallel to the one surface of the body covered by the noise reduction insulating layer.

16. The multilayer capacitor of claim 10, wherein the noise reduction insulating layer includes epoxy resin.

17. A multilayer capacitor, comprising:

a body including a laminate structure in which at least one first internal electrode and at least one second internal electrode are alternately laminated in a first direction with at least one dielectric layer interposed therebetween;

first and second external electrodes spaced apart from each other and disposed on the body to be connected to the at least one first internal electrode and the at least one second internal electrode through opposing surfaces of the body, respectively;

a noise reduction insulating layer covering one surface of the body and one surfaces of the first and second external electrodes together; and first and second terminals spaced apart from each other and respectively disposed on the first and second external electrodes and covering portions of the noise reduction insulating layer, wherein a portion of the first external electrode covered by the noise reduction insulating layer includes a fired layer and a conductive resin layer disposed on the fired layer, wherein another surface of the body opposite the one surface of the body in the first direction is devoid of any noise reduction insulating layer, wherein at least a portion of the noise reduction insulating layer is arranged between at least one of the first or second external electrode and a respective one of the first or second terminal electrode in the first direction, and wherein the at least a portion of the noise reduction insulating layer extends beyond the opposing surfaces of the body in a second direction perpendicular to the first direction.

18. The multilayer capacitor of claim 17, wherein the portion of the first external electrode covered by the noise reduction insulating layer further includes a plating layer disposed on the conductive resin layer.

19. The multilayer capacitor of claim 17, wherein the noise reduction insulating layer has a Young's modulus lower than a Young's modulus of the at least one dielectric layer.

20. The multilayer capacitor of claim 17, wherein the noise reduction insulating layer includes epoxy resin.

* * * * *